Figure 1:
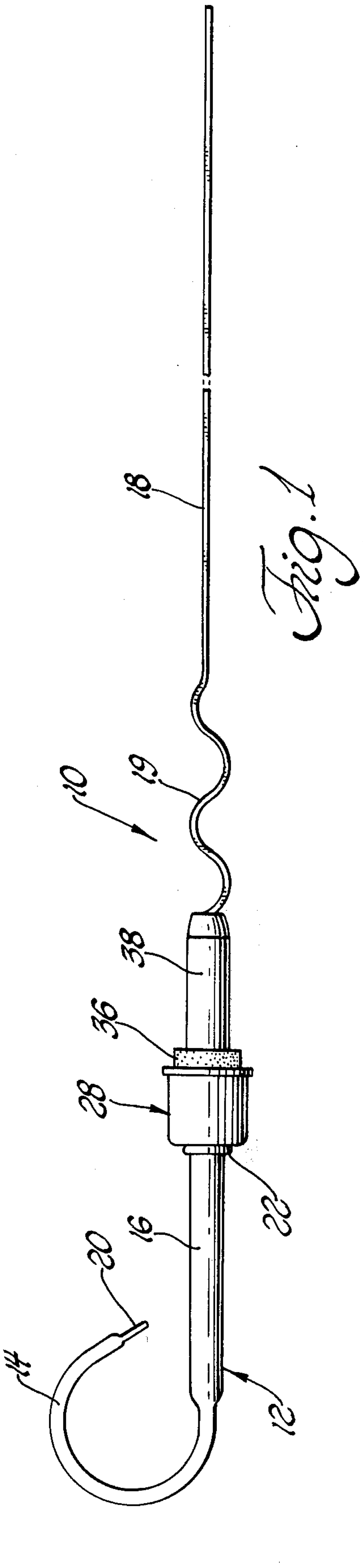

United States Patent [19]

Haines

[11] 3,991,476

[45] Nov. 16, 1976

[54] DIP STICK WITH SEALING SLEEVE

[76] Inventor: Walter E. Haines, 1865 Wingate, Bloomfield Hills, Mich. 48013

[22] Filed: Oct. 10, 1975

[21] Appl. No.: 621,371

[52] U.S. Cl. .......... 33/126.7 R
[51] Int. Cl.[2] .......... G01F 23/04
[58] Field of Search .......... 33/126.7 R

[56] References Cited

UNITED STATES PATENTS

| | | | |
|---|---|---|---|
| 2,705,372 | 4/1955 | Cornell | 33/126.7 R |
| 3,488,855 | 1/1970 | Howe | 33/126.7 R |
| 3,626,596 | 12/1971 | Manke | 33/126.7 R |
| 3,722,102 | 3/1973 | Jackson et al. | 33/126.7 R |

*Primary Examiner*—Charles E. Phillips
*Attorney, Agent, or Firm*—McGlynn and Milton

[57] ABSTRACT

A dip stick assembly is disclosed which includes a sealing sleeve member attached to the end of the dip stick handle which is adapted to extend into an access tube and frictionally engage the interior thereof to prevent loosening of the dip stick and to facilitate sealing against the escape of vapors through the tube. The dip stick assembly also includes a cap member which cooperates with the sealing sleeve and a method is disclosed for assembling the dip stick handle, sealing sleeve, and cap member.

10 Claims, 2 Drawing Figures

DIP STICK WITH SEALING SLEEVE

This invention relates to a dip stick assembly of the type employed in internal combustion engines for indicating various fluid levels, such as, for example, the oil level in the crankcase.

In response to the energy shortage and the ecology movement, major auto manufacturers have developed smaller, cleaner engines for use in passenger vehicles and the like. One of the steps which have been taken to clean up engine emissions is to burn the vapors which develop in the crank case of the engine. Heretofore, such vapors have merely been permitted to escape through openings, such as, the access tube for the dip stick. Now, however, this cannot be permitted if the engine is to pass the stringent government-instituted regulations regarding emissions. Therefore, the access tube must be sealed to prevent the escape of such vapors. Accordingly, various sealing devices have been suggested and incorporated into the design of the dip stick assembly for this purpose.

A problem, particularly associated with the smaller engines, is that engine vibration and pressure within the crankcase cause the dip stick assembly to work its way out of the access tube, thus breaking the seal. When this occurs, the emission level of the engine increases and the engine is generally incapable of passing the emissions tests. Additionally, it is undesirable for the dip stick to become loose since, in this condition, it tends to rattle. Therefore, the dip stick must not only have the ability to seal the access tube against the escape of crankcase vapors, but must also have the capacity to withstand the mechanical forces tending to loosen the dip stick from the access tube.

The instant invention provides a dip stick assembly which accomplishes both of the foregoing objectives by employing a sealing sleeve which surrounds the end of the dip stick handle and is adapted to be received within the access tube. The sealing sleeve is made with an outer diameter which is only slightly less than the inner diameter of the access tube. In this way, a tight fit is established between the sealing sleeve and the access tube. This tight fit creates frictional resistance against loosening of the dip stick assembly by the mechanical forces created by the engine and also facilitates sealing the access tube against escaping vapors.

As in conventional dip sticks, the dip stick assembly of the instant invention also includes a cap mounted on the handle member having a skirt surrounding the outer diameter of the access tube. The instant invention also provides an efficient and economical method for assembling the handle member, sealing sleeve and cap. The method involves providing an abutment on the handle member, sliding the cap member onto the handle member into abutting engagement with the abutment, sliding the sealing sleeve onto the handle member and against the cap member, and swaging the sealing sleeve into mechanical gripping engagement with the handle member. In this manner the cap member is sandwiched between the abutment and the sealing sleeve and is thus held permanently in place.

Figure 2:
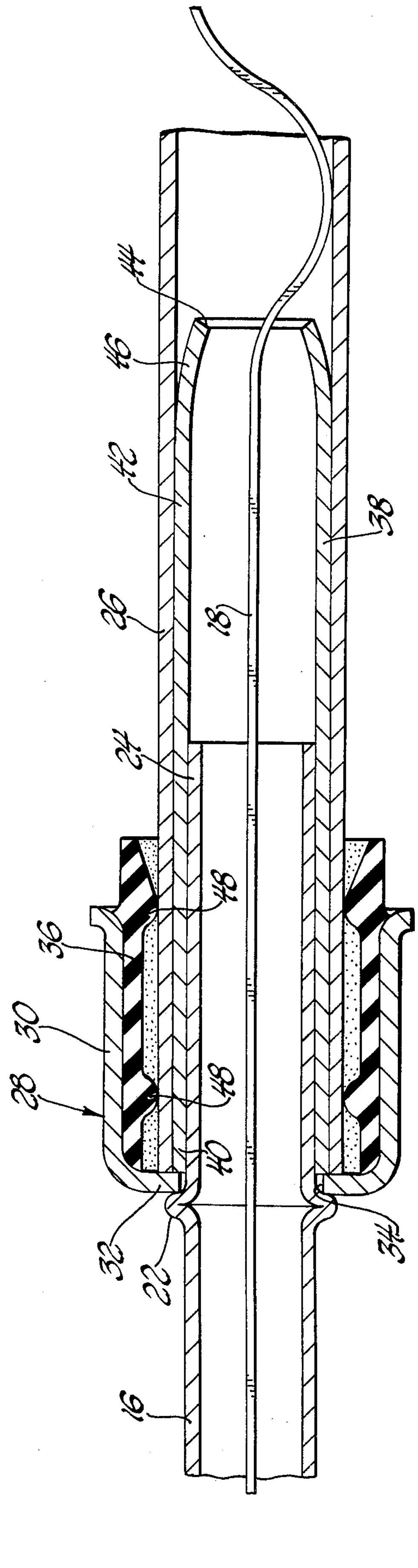

Other advantages of the present invention will be readily appreciated as the same becomes better understood by reference to the following detailed description when considered in connection with the accompanying drawings wherein:

FIG. 1 is an elevational view of a dip stick assembly constructed in accordance with the instant invention; and FIG. 2 is a cross-sectional view of the dip stick assembly of FIG. 1 disposed within an access tube.

Referring more particularly to the drawings, a dip stick assembly constructed in accordance with the instant invention is shown generally at 10 in FIG. 1. The dip stick assembly includes a handle member, generally indicated at 12, which is tubular in form and includes an arcuate portion 14 and a straight portion 16. An elongated fluid-level indicating member 18 is attached to the handle member. The indicating member 18 includes a number of undulations 19 for positively locating the indicating member 18 in the center of the access tube 18. This attachment may be accomplished by any suitable manner. In the dip stick assembly shown, the attachment is accomplished by beginning with a straight tubular member which is disposed about the end of the indicating member 18. The end of the tubular member is then crimped as at 20 and bent into the arcuate portion 14 to permanently trap the end of the indicating member 18. Obviously, other means of attaching the indicating member 18 to the handle member 12 may be employed if desired without detracting from the concept of the instant invention.

Abutment means 22 is formed on the surface of the straight portion 16 at a point spaced from the end 24 thereof. The end 24 of the straight portion 16 below the abutment means 22 is receivable within the access tube 26, as shown in FIG. 2. The abutment means 22 may comprise an annular rib extending radially from and encircling the straight portion 16 of the handle member 12. Although the abutment means 22 may be provided in any suitable fashion, the rib is formed by axially compressing the straight portion 16 by any suitable metalworking technique. This forms the abutment means 22 in a shape which is highly suited for the function described below.

The dip stick assembly 10 also includes a cap member generally indicated at 28. The cap member includes a skirt portion 30 which extends toward the end of the straight portion 16 and an inwardly extending flange 32. The inwardly extending flange 32 forms an end wall of the cap member 28 and defines a circular aperture therein. The diameter of the aperture 34 in the cap member 28 is sufficiently greater than the outer diameter of the straight portion 16 so that the cap member 28 may be readilyl slid onto the straight portion 16 and into abutting engagement with the abutment means 22. The cap member 28 is also provided with a seal 36 of rubber, or the like, for engaging the external surface of the access tube 26.

A sealing sleeve 38 is provided which slides over the end 24 of the straight portion 16 below the abutment means 22. The sealing sleeve includes a first end 40 which engages the flange 32 of the cap member 28 to maintain the same in abutting engagement with the abutment means 22. The sealing sleeve 38 also includes a second end 42 which terminates a distance beyond the end 24 of the straight portion 16 and includes an opening 44 therein. The sealing sleeve 38 is preferably swaged to establish mechanical gripping engagement with the straight portion 16 so that it is substantially permanently attached thereto. Since the flange 32 of the cap member 28 is sandwiched between the abutment means 22 and the end 40 of the sealing sleeve 38, it is held permanently in place. Thus, the assembly of these three elements is completed.

Although swaging has been found to be the most convenient and economical way in which to attach the sealing sleeve to the handle member, it is contemplated that other methods may be employed. For example, it may be possible to braze the sealing sleeve to the handle member.

As shown, the sealing sleeve 38 is tubular. It is preferably formed of metal such as SAE 1010-1008 steel tubing. The sealing sleeve 38 is designed to prevent the escape of vapors from the crankcase through the access tube 26. More importantly, however, the sealing sleeve 38 frictionally engages the inner surface of the access tube 26 so that the dip stick cannot work itself loose due to engine vibration and internal pressure. In order to accomplish this function, the outer diameter of the sealing sleeve 38 is held so that it is only slightly less than the inner diameter of the access tube 26. Consequently, the outer surface of the sealing sleeve 38 frictionally engages the inner surface of the access tube 26, thus, resisting outward movement of the dip stick assembly 10 from the access tube 26. It has been found that if the difference between the outer and inner diameters does not exceed 0.015 inches, this result will be achieved. Moreover, it is noted that the outer surface of the sealing sleeve 38 sealingly engages the inner surface of the access tube 26 over substantially the entire length of the sealing sleeve 38. In this manner, lateral, or side-to-sidemovement, of the dip stick is reduced. In other words, the extended contact surface adds to the stability of the dip stick when it is seated in the access tube.

Since the outer diameter of the sealing sleeve 38 so closely approximates the inner diameter of the access tube 26, the end 42 of the sealing sleeve 38 is tapered as at 46. The taper 46 aids in aligning the sealing sleeve 38 with the open end of the access tube 26 when inserting the dip stick assembly 10. Other than the tapered portion 46, however, the remaining surface of the sealing sleeve 38 engages the inner surface of the access tube 26.

The seal 36 supported by the cap member 28 includes inwardly extending annular ribs 48 which engage the outer surface of the access tube 26. As described above, the outer surface of the sealing sleeve 38 engages the inner surface of the access tube 26. Hence, the seal 36, with its ribs 48, and the sealing sleeve 38 cooperate to seal the access tube 26 against the escape vapors from the crankcase. The sealing sleeve 38 also functions to prevent inadvertent loosening of the dip stick assembly 10 from the access tube 26.

The instant invention also provides an economical method of manufacturing the dip stick assembly 10. As suggested above, a handle member 12 is provided including a straight portion 16. Abutment means 22, such as the annular rib, is formed on the straight portion 16. In the embodiment shown, the annular rib is formed by an upsetting operation. However, other methods and other kinds of abutment means may be used. A preformed cap member 28 is then slid onto the straight portion 16 and into engagement with the abutment means 22. At this point, the cap member 28 i only loosely held on the straight portion 16. The sealing sleeve 38 is then slid onto the straight portion 16 and into engagement with the flange 32 of the cap member 28 to hold it against the abutment means 22. The sealing sleeve 38 is then swaged onto the straight portion 16 so that the sealing sleeve 38 mechanically grips the straight portion 16. The three elements, the handle member 12, the cap member 28, and the sealing sleeve 38, are thus held together by means of the single swaging operation. It is noted that the fluid-level indicating member 18 may be attached either before or after the above-described operation.

Dip stick assemblies manufactured in accordance with the instant invention have been found to function extremely well under actual operating conditions. The dip stick assembly easily meets or exceeds all of the manufacturer's specifications and does not loosen or rattle as do many other dip stick assemblies.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiment of the invention in which an exclusive property or privilege is claimed are defined as follows:

1. A dip stick assembly of the type received in an access tube, said assembly comprising: a handle member including an arcuate portion and a straight portion, an elongated fluid-level indicating member attached to said handle member, abutment means on the surface of said straight portion spaced from the end thereof, a sealing sleeve surrounding a portion of said straight portion below said abutment means in mechanical gripping engagement therewith and extending beyond the end thereof, a cap member including a skirt portion surrounding a portion of said sealing sleeve and extending toward the outer end thereof and an inwardly extending flange portion captured between said abutment means and inner end of said sealing sleeve; said sealing sleeve has an outer diameter slightly less than the inner diameter of the access tube, thereby establishing close fitting engagement between said sealing sleeve and the access tube to hold the dipstick assembly in place and to at least partially seal the access tube.

2. An assembly as set forth in claim 1 wherein the difference in said outer and inner diameters does not exceed 0.015 inches.

3. An assembly as set forth in claim 1 wherein said sealing sleeve includes an inwardly tapered portion at its outer end.

4. An assembly as set forth in claim 3 wherein said abutment means comprises an annular rib encircling said straight portion of said handle member.

5. An assembly as set forth in claim 4 wherein said cap member includes a seal for engaging the outer diameter of the access tube.

6. A dip stick assembly of the type received in an access tube, said assembly comprising: a handle member including a straight portion having an end receivable within the access tube; abutment means extending radially from the exterior surface of said straight portion and spaced from the end thereof; a cap member mounted on said straight portion and in abutting engagement with said abutment means; a sealing sleeve in mechanical gripping engagement with said end of said straight portion for sealingly engaging the inner surface of said access tube over substantially the entire length of said sealing sleeve, said sealing sleeve including a first end engaging said cap member to maintain the same in abutting engagement with said abutment means and a second end terminating a distance beyond said straight portion and including an opening; and fluid-level indicating means attached to said handle member and extending through said sealing sleeve and said opening in said second end thereof; wherein said sealing sleeve has an outer diameter slightly less than the inner diameter of the access tube, thereby establishing close fitting engagement between said sealing sleeve and the access tube to hold the dipstick assembly in place and to at least partially seal the access tube.

7. An assembly as set forth in claim 6 wherein the difference in said outer and inner diameters does not exceed 0.015 inches.

8. An assembly as set forth in claim 7 wherein said sealing sleeve includes an inwardly tapered portion at its outer end.

9. An assembly as set forth in claim 1 wherein said abutment means comprises an annular rib encircling said straight portion of said handle member.

10. An asssembly as set forth in claim 9 wherein said cap member includes a seal for engaging the outer diameter of the access tube.

* * * * *